Patented June 3, 1952

2,598,838

UNITED STATES PATENT OFFICE 2,598,838

POTATO PRODUCT

George R. Schermerhorn, Sr., and Henry C. Hinz, Jr., Rochester, N. Y., assignors to American Home Foods, Inc., New York, N. Y., a corporation of New Jersey No Drawing. Application October 26, 1950, Serial No. 192,360

5 Claims. (Cl. 99—154)

This invention relates to a method of preparing a canned potato product and more particularly relates to a method for producing a strained sweet potato product.

When harvested, sweet potato tubers contain a relatively high proportion of starch to sugar, and consequently are rather dry and tasteless when prepared. If the potatoes are stored under the proper conditions after being harvested, a portion of the starch will be hydrolyzed to sugar by the enzymes occurring naturally in the tuber, giving the cooked product its characteristic sweet taste. Usually, however, sweet potatoes which have been stored even under controlled conditions, do not exhibit the maximum sweetness deemed desirable for a commercial product.

In the commercial processing of sweet potatoes for canned pureed foods, it is desirable to have as high a sugar content and as low a starch content as is consistent with a soft creamy consistency. Aside from the lack of sufficient sweetness, the presence of a large proportion of starch in the sweet potatoes results in a product that is objectionable from a consumer acceptance standpoint in that high starch content results in a thick firm gel that has a tendency to shrink, leaving a hard core of solid material in the center of the container surrounded by free intermicellar liquid that has been squeezed out. These gels tend to crack and discolor. Moreover the product is of a very light color and does not have the sweet flavor desired in sweet potatoes. Finally, the product has a tendency to form unsightly white masses of free starch.

In order to obtain a product of soft creamy consistency and to avoid liquefaction, it is necessary to maintain the starch element of the solids to not less than about 35% by weight. This requirement therefore necessitates a close control on the amount of starch hydrolyzed to sugar.

The storage of sweet potatoes to effect the natural hydrolysis of starch to sugar has many disadvantages and is not commercially desirable since, firstly, when sweet potatoes are stored, costly losses occur through rot, shrinkage and spoilage. In addition, the facilities involved for controlled storage and extra handling would involve great expense. A more serious objection lies in the fact that since it is impossible to predict the rate of natural hydrolysis with any accuracy, production scheduling is very difficult and involves inefficient use of processing facilities.

Although it is known to the prior art to take advantage of the enzymes naturally occurring in the tubers for the hydrolysis of the starch to sugar, the non-uniformity of starch and enzyme content of the sweet potatoes in any one batch, or from batch to batch, makes it impractical to depend upon said naturally occurring enzymes, especially since one of the prime requisites of a commercial product is uniformity from batch to batch despite variations in the starting materials.

Therefore it is the object of our invention to hydrolyze a large portion of the starch in sweet potatoes to sugar.

It is a further object of our invention to effect hydrolysis in such a manner as to prepare a product of uniform sugar content from batch to batch and as to eliminate the costly, wasteful and inefficient hydrolysis by storing of the harvested sweet potatoes.

Other objects will become apparent from the following description of the invention.

We have been able to accomplish the objects stated above by adding to sweet potatoes an amylolytic enzyme and maintaining the mixture at a temperature suitable to rapid hydrolysis for a time sufficient to convert a predetermined amount of starch to sugar.

The product obtained through the use of the process of our invention is easily controlled as to sugar and starch content and is of a consistent soft, creamy, plastic texture that does not suffer from cracking, starch separation or gel formation with its attendant disadvantages, and is highly acceptable to the consumer as to physical appearance and flavor.

In carrying out our invention, the peeled and trimmed tubers are first cooked in water until they are soft enough to be mashed easily, the cooking conditions depending upon the size and degree of maturity of the particular potatoes. Usually about 10–30 minutes in the range of about 160–240° F. is sufficient; however, we prefer to cook the potatoes for about 15–20 minutes at a temperature in the range of 180–210° F. to obtain the desired degree of softness.

The softened potatoes are then comminuted or mashed by any suitable means. We have found a commercial cyclone pulper to be well suited to the preparation of our preferred product.

To the mass of mashed cooked potatoes is now added an amylolytic enzyme and the mixture is brought to a temperature in the range of about 90–185° F. and held for a time sufficient to hydrolyze the starch until the proper sugar content is reached.

It is desirable to obtain a product with as high a sugar content as is consistent with the desired physical properties. Furthermore, to prevent the gel formation and liquefaction previously mentioned, we have found it necessary to continue the hydrolysis until the starch content of the product is reduced to within the range of about 35-70%. Our preferred product has a starch content of about 50-60% by weight, based on the total solids.

The amylolytic enzyme used in carrying out the process may be derived from any well-known source. While any amylolytic enzyme may be used, various germinating grains are excellent sources of diastase, an amylolytic enzyme, and one of the most readily available forms of this enzyme is diastatic malt syrup made from germinating barley. Depending upon the temperature of the hydrolysis, an amount of diastatic malt syrup in the range of one part to 250 parts by weight of peeled and trimmed sweet potatoes to one part to 65 parts of potatoes may be used to effect the desired conversion of starch to sugar in a commercially feasible length of time.

In the preferred embodiment of our invention we add a selected amount of diastatic malt syrup to the comminuted potato mass which is maintained within the temperature range of 150-180° F. for about 10 minutes, after which the mixture is heated rapidly to 210° F. to destroy the enzyme thereby preventing further hydrolysis of the starch. If the comminuted sweet potatoes are over 180° F. as they are discharged from the pulper, they should be cooled before adding the malt syrup. Following the hydrolysis, the product is then canned by the usual commercial method.

The following example is illustrative of the invention: 2,000 pounds of peeled and trimmed sweet potatoes were cooked in water at 190° F. for about 20 minutes. They were then passed through a commercial cyclone pulper. To the sweet potato pulp which emerged from the pulper at about 170° F. was added 14 pounds of 40 to 50 degree lintner diastatic malt syrup. The mixture was kept at approximately 160-165° F. for 10 minutes and then heated rapidly to 210° F. and held at this temperature for a sufficient time to destroy the enzyme. The product was then canned.

The method of the invention as above described produces a product having a predetermined desirable sugar content that is reproducible with successive batches of potatoes regardless of their initial sugar content.

We claim:
1. The method of preparing a sweet potato food product comprising adding an amylolytic enzyme to the sweet potatoes, maintaining the potatoes and enzyme under hydrolytic conditions until the sugar content of the sweet potatoes is from 30-65% by weight of the whole, and then raising the temperature of the mixture to a point whereby the enzyme is inactivated.

2. The method according to claim 1 in which the enzyme is diastase.

3. The method according to claim 1 in which the enzyme is added in the form of diastatic malt syrup.

4. The method of preparing a sweet potato food product comprising cooking the sweet potatoes until soft, adding an amylolytic enzyme to the potatoes, maintaining the mixture at a temperature range of about 90°-185° F. until the sweet potatoes have a sugar content from approximately 30% to 65% by weight, and then raising the temperature of the mixture to a point whereby the enzyme is inactivated.

5. The method of preparing a sweet potato food product comprising cooking the sweet potatoes in water until soft, adding diastatic malt syrup to the potatoes, holding the mixture at a temperature range of about 150°-180° F. until the sweet potatoes have a sugar content from about 30% to 65% by weight, and then raising the temperature of the mixture to approximately 210° F. to inactivate the enzyme.

GEORGE R. SCHERMERHORN, Sr.
HENRY C. HINZ, Jr.

REFERENCES CITED

The following references are of record in the file of this patent:

UNITED STATES PATENTS

| Number | Name | Date |
|--------|------|------|
| 525,971 | Takamine | Sept. 11, 1894 |
| 2,006,146 | Miller | June 25, 1935 |
| 2,176,347 | Jansen | Oct. 17, 1939 |